United States Patent
Di Censo et al.

(10) Patent No.: US 9,591,149 B2
(45) Date of Patent: Mar. 7, 2017

(54) GENERATION OF A COMBINED IMAGE OF A PRESENTATION SURFACE

(75) Inventors: Davide Di Censo, Los Altos, CA (US); Stefan J. Marti, Santa Clara, CA (US); Seung Wook Kim, Cupertino, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 1164 days.

(21) Appl. No.: 13/459,825

(22) Filed: Apr. 30, 2012

(65) Prior Publication Data

US 2013/0286199 A1    Oct. 31, 2013

(51) Int. Cl.
*H04N 7/18*    (2006.01)
*H04N 1/00*    (2006.01)
*H04N 1/32*    (2006.01)

(52) U.S. Cl.
CPC ..... *H04N 1/00129* (2013.01); *H04N 1/32144* (2013.01); *H04N 2201/0084* (2013.01); *H04N 2201/0438* (2013.01); *H04N 2201/3245* (2013.01); *H04N 2201/3249* (2013.01); *H04N 2201/3269* (2013.01)

(58) Field of Classification Search
None
See application file for complete search history.

(56) References Cited

U.S. PATENT DOCUMENTS

| | | | |
|---|---|---|---|
| 5,566,251 A * | 10/1996 | Hanna et al. | 382/284 |
| 5,689,562 A * | 11/1997 | Hassan et al. | 382/236 |
| 6,311,042 B1 | 10/2001 | DeSchrijver | |
| 7,224,847 B2 | 5/2007 | Zhang et al. | |
| 7,260,278 B2 | 8/2007 | Zhang et al. | |
| 2004/0075820 A1 * | 4/2004 | Chu et al. | 353/122 |
| 2006/0119584 A1 | 6/2006 | Lai et al. | |
| 2007/0286496 A1 * | 12/2007 | Matsuzaki et al. | 382/209 |
| 2009/0286477 A1 * | 11/2009 | Braun | 455/41.2 |
| 2011/0317905 A1 * | 12/2011 | Sam | G06K 9/033 382/135 |
| 2012/0075491 A1 * | 3/2012 | Hoarau | G06F 3/1204 348/222.1 |

OTHER PUBLICATIONS

Abdurazzag Ali Aburas and Othman O Khalifa, "PDA Mobile Learning Using Indoor Intelligent Wireless Whiteboard," Turkish Online Journal of Distance Education-TOJDE, Apr. 2007, pp. 9-13, vol. 8, No. 2, Available at: <tojde.anadolu.edu.tr/tojde26/pdf/auras_khalifa.pdf>.

(Continued)

*Primary Examiner* — Joseph Ustaris
*Assistant Examiner* — Edemio Navas, Jr.
(74) *Attorney, Agent, or Firm* — Kilpatrick Townsend & Stockton, LLP (57) ABSTRACT

Example embodiments relate to generating a combined image of a presentation surface. In example embodiments, an image including a portion of a presentation surface is captured using a camera. A location identifier is then received, where the location identifier specifies a location of a digital version of the content displayed on the presentation surface. Next, the digital version of the content displayed on the presentation surface is retrieved from the location specified by the location identifier. Finally, a combined image is generated by combining the captured image and the retrieved digital version of the content displayed on the presentation surface.

20 Claims, 4 Drawing Sheets

(56) References Cited

OTHER PUBLICATIONS

Johan Sanneblad and Lars Erik Holmquist, "Browsing Captured Whiteboard Sessions Using a Handheld Display and a Jog Dial," 2003, pp. 1-2, Future Applications Lab, Viktoria Institute, Göteborg, Sweden, Available at: <sics.se/fal/publications/2003/totalrecall2.pdf>.

* cited by examiner

GENERATION OF A COMBINED IMAGE OF A PRESENTATION SURFACE

BACKGROUND

In both business and personal contexts, people often communicate ideas with one another via presentations, lectures, and other exchanges of information. In doing so, the person conveying information often relies on visual aids, such as electronic slides, written notes, or drawn diagrams. For example, the user may share his or her visual aids with an audience via a presentation surface, such as a projection screen, electronic whiteboard, or video display.

BRIEF DESCRIPTION OF THE DRAWINGS

The following detailed description references the drawings, wherein.

DETAILED DESCRIPTION

As detailed above, a common method for communicating ideas is via a presentation or lecture, where the presenter uses visual aids displayed or written on a presentation surface. For example, the speaker may display electronic slides using a projection screen or handwrite notes on a whiteboard surface. In some scenarios, a person viewing the presentation surface may desire to obtain a digital version of the content currently displayed on the surface.

In current solutions, a user may obtain a digital version of the content in a number of ways. As one example, the user may download a digital version of the content at a predetermined Uniform Resource Locator (URL), provided that the presenter has previously made the content available at the URL. As another example, an electronic whiteboard may capture the content currently written on the surface, save a digital version of the content, and distribute the digital version of the content to requesting users.

In each of these scenarios, the digital version of the content that is distributed to users contains only the contents of the presentation surface and does not capture the surrounding area. If the user desires to include the surroundings of the presentation surface, such as the person speaking, the room, and other audience members, the user may instead take a picture using a camera. When directly taking a picture, however, the image may include reflections, obstructions, graininess, or other attributes that make it difficult to accurately view the contents of the presentation surface within the image.

Example embodiments disclosed herein address these issues by allowing a user to capture an image of a presentation surface that includes the surrounding area, while ensuring that the presentation surface is readable and free of reflections, obstructions, and other distractions. For example, in some implementations, a user may capture a picture of a presentation surface using a camera, such as a standalone camera or a camera embedded in another device. A portion of the captured image may include the presentation surface, while another portion of the image may include the area surrounding the presentation surface. The device may then receive a location identifier specifying a location of a digital version of the content displayed on the presentation surface and subsequently retrieve the digital version from the specified location. Finally, the user's device may generate a combined image by combining the originally-captured image with the retrieved digital version of the content displayed on the presentation surface.

In this manner, example embodiments enable a user to capture an image of a presentation surface and the area surrounding the presentation surface, while subsequently replacing the presentation surface in the image with a high quality version. As a result, a user may use his or her computing device to capture an image of the presentation surface and any surrounding areas, and the device may automatically generate a high quality image that includes the digital version of the presentation surface. Example embodiments thereby facilitate a simple interaction method that enables the acquisition of an image including a digital version of a presentation surface and any proximate areas of interest.

Figure 1:
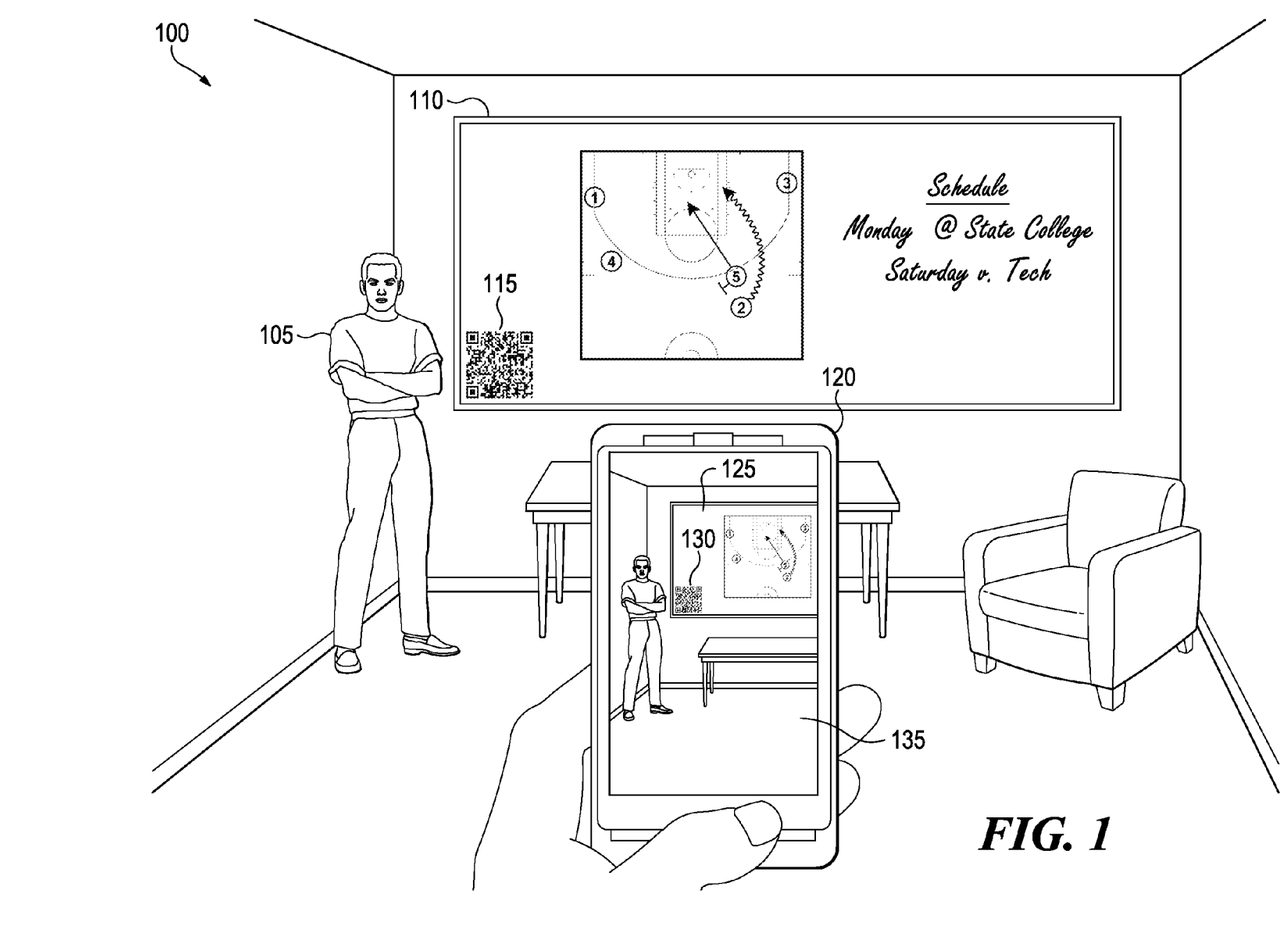
FIG. 1 is a diagram illustrating an example computing device in operation to generate a combined image of an electronic whiteboard and a surrounding environment.

Referring now to the drawings, the following description of FIG. 1 provides an overview of example embodiments disclosed herein. Further implementation details regarding various embodiments are provided below in connection with FIGS. 2 through 5. FIG. 1 is a diagram illustrating an example computing device 120 in operation to generate a combined image of an electronic whiteboard 110 and a surrounding environment 100.

As illustrated, the environment 100 is a room in which a speaker 105 is standing next to an electronic whiteboard 110 that includes a matrix barcode 115, a sketch of a basketball play, and a handwritten schedule of upcoming games. The matrix barcode 115 encodes a location identifier that indicates a location of a digital version of the content currently included on whiteboard 110. For example, the matrix barcode 115 may encode an Internet Protocol (IP) address of a network module of the electronic whiteboard 110.

As further illustrated, a user is pointing a mobile phone 120 at the electronic whiteboard 110 and has captured an image of the whiteboard 110 using a camera embedded in the phone 120. As depicted on the display of mobile phone 120, the captured image includes an image 125 of the whiteboard 115, an image 130 of the matrix barcode 115, and an image 135 of the surrounding environment 100. After capturing the image, mobile phone 120 may initially scan the image for a matrix barcode, detect the presence of barcode 130 within the image, and decode the barcode 130 to obtain a location identifier of the electronic whiteboard 110.

After obtaining the location identifier of the whiteboard 110, mobile phone 120 may then negotiate a connection with the whiteboard 110 and request a digital version of the content currently contained on the whiteboard 110. In response, whiteboard 110 may generate a digital image of its current contents, which in this case includes the QR code, the basketball play, and the handwritten schedule. Whiteboard 110 may then transmit the digital image to mobile phone 120 over the negotiated connection.

Finally, in response to receiving the digital version of the whiteboard contents, mobile phone 120 may generate a combined image. In particular, mobile phone 120 may analyze the captured image to identify the portion of the whiteboard included in the captured image, which is in this case the left half of the whiteboard. Then, mobile phone 120 may crop the image received from the whiteboard to include only the left half and replace the corresponding portion of the captured image with the left half of the digital version. In this manner, the combined image may include a high quality version of the whiteboard, while continuing to contain the surrounding environment, such as the room and the speaker.

Figure 2:
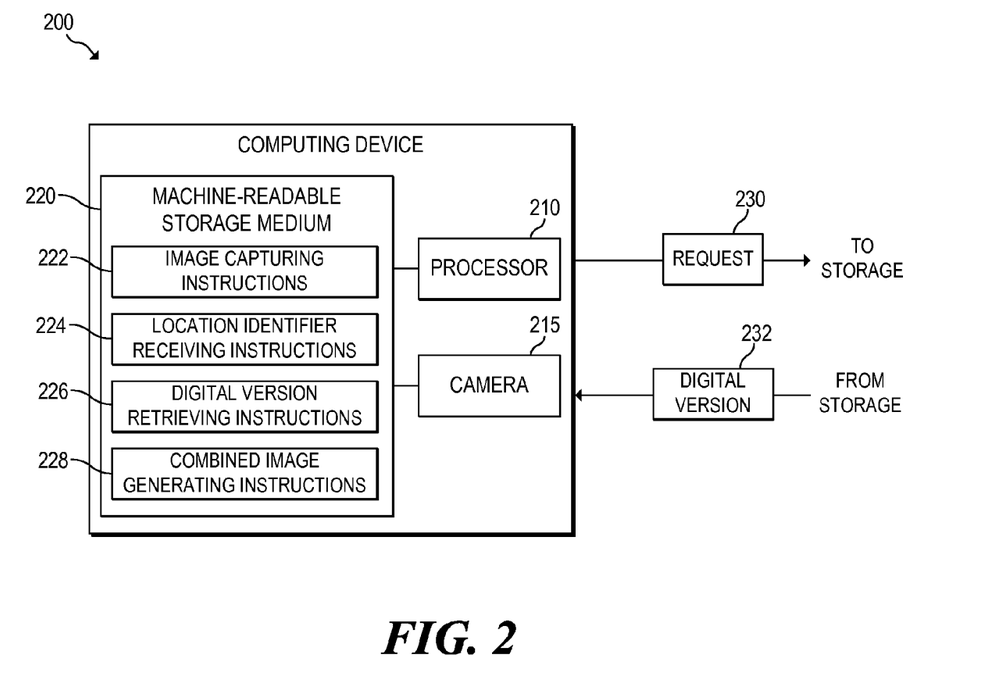
FIG. 2 is a block diagram of an example computing device for generating a combined image using a captured image and a retrieved digital version of a presentation surface.

FIG. 2 is a block diagram of an example computing device 200 for generating a combined image using a captured image and a retrieved digital version of a presentation surface. Computing device 200 may be, for example, a mobile phone, a tablet or slate, a notebook computer, a desktop computer, or any other computing device that includes or is otherwise coupled to a camera 215. Alternatively, computing device 200 may be a standalone camera, such as a point-and-shoot camera or a digital single-lens reflex camera (SLR). In the embodiment of FIG. 2, computing device 200 includes a processor 210, a camera 215, and a machine-readable storage medium 220.

Processor 210 may be one or more central processing units (CPUs), semiconductor-based microprocessors, and/or other hardware devices suitable for retrieval and execution of instructions stored in machine-readable storage medium 220. Processor 210 may fetch, decode, and execute instructions 222, 224, 226, 228 to generate an image that is a combination of a captured image and a digital version of a presentation surface. As an alternative or in addition to retrieving and executing instructions, processor 210 may include one or more electronic circuits that include electronic components for performing the functionality of one or more of instructions 222, 224, 226, 228.

Camera 215 may be any device that includes one or more electronic image sensors for capturing and generating digital photographs. For example, camera 215 may include one or more lenses and a diaphragm for focusing light onto a digital sensor. As mentioned above, in some embodiments, computing device 200 may itself be a digital camera, provided that the camera includes components for establishing a communication session with a remote device that stores a digital version 232 of a presentation surface.

Machine-readable storage medium 220 may be any electronic, magnetic, optical, or other non-transitory physical storage device that contains or stores executable instructions. Thus, machine-readable storage medium 220 may be, for example, Random Access Memory (RAM), an Electrically Erasable Programmable Read-Only Memory (EEPROM), a storage device, an optical disc, and the like. As described in detail below, machine-readable storage medium 220 may be encoded with a series of executable instructions 222, 224, 226, 228 for capturing an image, obtaining a digital version of the contents of a presentation surface, and generating a combined image using the captured image and the digital version.

Image capturing instructions 222 may initially utilize camera 215 to capture an image, such that a portion of the image includes a presentation surface. For example, a user of computing device 200 may point camera 215 at the presentation surface and activate a capture button or user interface element, thereby obtaining a digital image that includes the presentation surface. The image captured by the user may also include the environment surrounding the presentation surface, such as the room or other area that includes the presentation surface and people in the room or area, such as the person or people who are presenting.

The presentation surface may be any area used for displaying content, which may be electronic content generated with a computing device or handwritten content generated via a writing instrument. To name a few examples, the presentation surface may be an electronic or interactive whiteboard, a conventional non-interactive whiteboard, a chalkboard, a projection screen, or an electronic display, such as a Liquid Crystal Display (LCD) or Light Emitting Diode (LED) display. As used herein, the term "presentation surface" is not limited solely to contexts in which a formal presentation is given. Rather, the presentation surface may also be used for informal talks, group discussions, or even by a single person.

Next, location identifier receiving instructions 224 may receive a location identifier that specifies a location of a digital version of content displayed on the presentation surface. The location identifier may be, for example, an Internet Protocol (IP) address, Uniform Resource Locator (URL), or other data item that may be used by computing device 200 to connect to another device that stores a digital version of the current content of the presentation surface. For example, the location identifier may specify a direct communication link to the device that contains the presentation surface, such as an electronic whiteboard or a network-connected display. In such embodiments, the device that contains the presentation surface may directly provide the digital version of the content. As another example, the location identifier may indicate the location of a server, such as a cloud-based server, that stores a digital version of the content.

Identifier receiving instructions 224 may receive the location identifier in a variety of manners. In some implementations, the user may directly input the location identifier in response to a prompt from computing device 200. For example, after capturing the image and detecting a presentation surface in the image, computing device 200 may output a prompt requesting that the user enter the location identifier, such as the URL, IP address, or other character-based identifier.

In other implementations, computing device 200 may extract the location identifier from the captured image. For example, computing device 200 may scan the captured image to identify a fiducial marker included on the presentation surface and extract the location identifier by decoding the fiducial marker. In scanning the captured image, the computing device 200 may look for predetermined patterns or markers within the image that indicate the boundaries of a fiducial marker and, in response to finding these boundaries, decode the data contained within the identified boundaries. The fiducial marker may be any image-based object that visually encodes data that may be decoded using a given technique. As one specific example, the fiducial marker may be a matrix barcode, such as a Quick Response (QR) code or a similar two-dimensional matrix.

After receipt of the location identifier by receiving instructions 224, digital version retrieving instructions 226 may then transmit a request 230 for the digital version to the location specified by the location identifier. In response to the request, the device that is storing the digital version may reply with the digital version 232 of the content displayed on the presentation surface. The received digital version 232 of the content may be an image file, Portable Document Format (PDF) file, a presentation file, or any other electronic file from which an image of the content of the presentation surface may be obtained.

Prior to transmission of the digital version 232 to computing device 200, the device that stores the digital version 232 of the content may initially generate or otherwise obtain the digital version 232. For example, when the presentation surface is an interactive whiteboard, the whiteboard may generate an image of the content by processing input provided to sensors, such as touch sensors embedded in the whiteboard or sensors that track the movement of a stylus. As another example, when the presentation surface is a projection screen or other display, the device may gain access to a stored version of the content, such as an electronic presentation file.

Next, after receiving the digital version 232, combined image generating instructions 228 may generate a combined image. In particular, instructions 228 may generate the combined image by combining the image captured by camera 215 with the retrieved digital version 232 of the content displayed on the presentation surface.

In doing so, generating instructions 228 may initially perform image analysis to identify the portion of the captured image that includes the presentation surface. As one example of the image analysis, generating instructions 228 may attempt to identify the boundaries of the rectangular or square presentation surface. As another example, generating instructions 228 may use the fiducial marker included on the presentation surface to identify a predetermined position on the surface (e.g., the lower left corner, lower right corner, etc.) and perform analysis to identify the remaining surface. As one specific example, the fiducial marker may additionally encode the length and width of the surface with respect to the length and width of the marker, such that generating instructions 228 may accurately calculate the boundaries of the presentation surface within the captured image.

After identifying the presentation surface within the captured image, generating instructions 228 may then generate the combined image. For example, generating instructions 228 may replace the identified portion of the captured image that includes the presentation surface with a scaled copy of the digital version 232 received by receiving instructions 226. As another example, generating instructions 228 may generate a new image by creating a copy of the captured image and then performing the replacement procedure for the copied image. In this manner, computing device 200 may generate a combined image that includes a high quality version of the presentation surface, while also capturing the environment surrounding the surface, such as the room, a person presenting, and other people present in the room.

Figure 3:
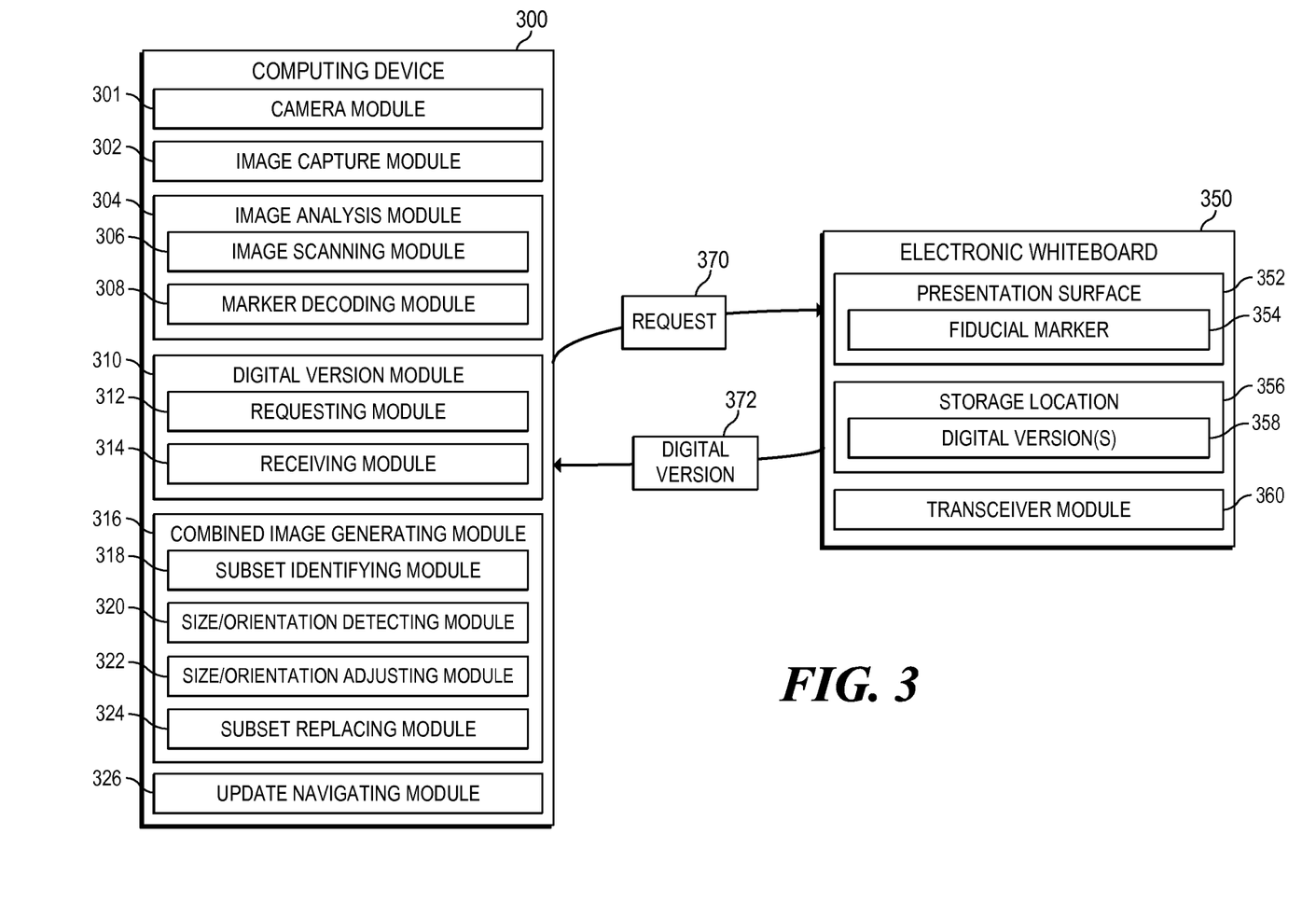
FIG. 3 is a block diagram of an example computing device in communication with an electronic whiteboard for generating a combined image using an image captured with a camera module and a retrieved digital version of the electronic whiteboard.

FIG. 3 is a block diagram of an example computing device 300 in communication with an electronic whiteboard 350 for generating a combined image using an image captured with a camera module and a retrieved digital version 372 of the electronic whiteboard 350. As described further below, computing device 300 captures an image of a presentation surface, retrieves a digital version 372 of electronic whiteboard 350 from the whiteboard 350, and generates a combined image using the captured image and the retrieved digital version.

As with computing device 200 of FIG. 2, computing device 300 may be any computing device suitable for capturing an image, retrieving a digital version of a presentation surface, and subsequently processing the images. As illustrated, computing device 300 may include a number of modules 301-326 for providing the image capturing and generating functionality described herein. Each of the modules may include a series of instructions encoded on a machine-readable storage medium and executable by a processor of computing device 300. In addition or as an alternative, each module may include one or more hardware components, such as electronic circuitry, for implementing the functionality described below.

Camera module 301 may be a set of electronic components for capturing and generating digital photographs. For example, camera module 310 may include one or more lenses, a diaphragm, and one or more digital sensors. As with computing device 200, computing device 300 may itself be a digital camera. Further details regarding camera module 301 are provided above in connection with camera 215 of FIG. 2.

Image capture module 302 may utilize camera module 301 to capture an image of an environment that includes a presentation surface. For example, a user may point the lens of camera module 301 at an environment, such that the optical or digital viewfinder includes the presentation surface and the environment surrounding the presentation surface. Image capture module 302 may then capture the image and generate a digital file that includes the presentation surface and the environment.

Image analysis module 304 may then analyze the image to obtain a location identifier that specifies a location of a digital version of the content currently displayed on the presentation surface. For example, image scanning module 306 may initially scan the image captured by image capture module 302 to detect a fiducial marker, such as a QR code or other two-dimensional marker that encodes data. In doing so, image scanning module 306 may search for predetermined image components that specify the boundaries of a fiducial marker within the image. As one specific example, a QR code includes required visual patterns, including a position marker, an alignment marker, and a timing marker. When the fiducial marker is a QR code, image capture module 302 may scan the image to identify these predetermined markers within the captured image.

Next, marker decoding module 308 may decode the identified fiducial marker to obtain the data encoded within the marker. For example, marker decoding module 308 may perform image analysis on the identifier fiducial marker to extract a location identifier decoded within the marker. As detailed above, the location identifier may specify a storage location from which computing device 300 can retrieve a digital version of the contents of the presentation surface. The image analysis used for decoding the identified marker will vary depending on the type of fiducial marker. Continuing with the previous specific example, when the marker is a QR code, decoding module 308 may use the identified position, alignment, and timing markers to decode the data encoded in the image and thereby obtain the location identifier.

After the fiducial marker is identified and decoded, digital version module 310 may then handle the process for requesting and retrieving a digital version of the content of the presentation surface. Thus, requesting module 312 may initially send a request 370 to the device at the location specified in the decoded location identifier, where the location is a URL, IP address, or other location accessible via wired or wireless communication. In response, the device that stores the digital version 372 (electronic whiteboard 350 in this case) may transmit the digital version 372 to computing device 300 for receipt by receiving module 314.

Note that, in some embodiments, the request 370 sent by requesting module 312 may include an identifier specifying the content to be retrieved. For example, the request 370 may include a name of a file encoded within the fiducial marker. As another example, the request 370 may include a slide number, page number, or other alphanumeric identifier specifying the particular digital version 372 to be returned from a set of content including multiple images, such as a presentation file or PDF file. In such embodiments, the device that stores the digital version, such an electronic whiteboard 350, may extract the content identifier, retrieve the corresponding content item, and return the corresponding digital version 372 to computing device 300.

In addition, in some embodiments, receiving module 314 may also periodically receive updates of the presentation content from the device that stores the digital version 372. For example, a device may determine when the content on the presentation surface has been modified and automatically transmit an update of the digital version 372 to computing device 300. The modification of the content may be, for example, changing of the slide of a presentation or changing of the writing/drawing on an electronic whiteboard 350. Combined image generating module 316 may then generate an additional combined image for each update using the process detailed below. As also detailed below, update navigating module 326 may then allow the user to scroll, cycle, or otherwise navigate between the various versions of the presentation surface.

After the digital version 372 is received, combined image generating module 316 may then perform image processing to generate a combined image that incorporates digital version 372 into the captured image. In particular, as detailed below, modules 318, 320, 322, 324 may identify the subset of the captured image that includes the presentation surface, detect the size and orientation of the presentation surface within the image, adjust the digital version 372 to match the detected size and orientation, and replace the identified subset with the adjusted digital version.

Subset identifying module 318 may initially identify the subset of the presentation surface that is included within the captured image. For example, suppose that only a portion of the presentation surface (e.g., the left half, lower left corner, etc.) is included within the captured image. Subset identifying module 318 may perform image analysis to determine which subset or portion of the presentation surface is in the image. Alternatively, in some situations, subset identifying module 318 may determine that the entire presentation surface is included within the captured image.

As one example, subset identifying module 318 may perform block-by-block comparisons to compare the contents of the captured image with the retrieved digital version 272. By identifying blocks of digital version 272 that are also included in the captured image, subset identifying module 318 may thereby identify which portions of the presentation surface are in the captured image. The output of module 318 may be a determination that X % of the length of the presentation surface is included in the captured image and Y % of the width of the presentation surface is included in the captured image.

As another example, subset identifying module 318 may rely on data encoded in the fiducial marker. For example, the fiducial marker may encode length and width information for the presentation surface, where the length and width are specified with respect to the length and width of the fiducial marker (e.g., the length is 10 times the length of the marker and the width is 5 times the width of the marker). In such embodiments, subset identifying module 318 may calculate the length and width of the fiducial marker, and then use the length and width information to calculate the expected length and width of the presentation surface within the captured image. Using these expected boundaries, module 318 may then determine whether the boundaries of the presentation surface would extend beyond the edge of the captured image and, if so, by how much. In this manner, module 318 may similarly determine the percentage of the width and length of the presentation surface that are included in the captured image.

Size and orientation detecting module 320 may then detect the size and orientation of the presentation surface within the captured image. For example, in detecting the size, detecting module 320 may rely on the data obtained by subset identifying module 318 to determine the length and width of the presentation surface within the captured image. In addition, detecting module 320 may also determine the orientation of the presentation surface, which may include an angle of rotation with respect to a horizontal axis and the effect of perspective. As an example, detecting module 320 may initially analyze the outline of the fiducial marker to determine the angle of rotation and any perspective effect on the fiducial marker, which may also apply to the presentation surface as a whole.

Size and orientation adjusting module 322 may then adjust the size and orientation of the retrieved digital version 372 to match the size and orientation of the presentation surface within the captured image. For example, adjusting module 322 may initially resize the digital version 372 to match the detected length and width of the presentation surface within the captured image. Adjusting module 322 may then rotate the resized image and skew the borders of the image in accordance with the angle and perspective effect detected by module 320.

Finally, subset replacing module 324 may replace the subset of the presentation surface in the captured image with the corresponding subset of the digital version. Replacing module 324 may initially truncate the digital version that has been adjusted for size and orientation according to the data calculated by subset identifying module 318. For example, replacing module 324 may truncate the digital version in accordance with the length and width percentages calculated by module 318. Replacing module 324 may then determine the target position of the digital version in the captured image by, for example, identifying the position of the fiducial marker in the captured image. Finally, subset replacing module 324 may insert the adjusted and truncated digital version into the originally-captured image at the determined position, such that the adjusted and truncated digital version replaces the presentation surface in the captured image.

Update navigating module 326 may allow the user to navigate between versions when generating module 316 has generated multiple combined images in response to receipt of one or more updated digital versions by receiving module 314. For example, update navigating module 326 may display a user interface element that enables the user to switch a currently-displayed image between the combined images (e.g., in chronological order). As one specific example, navigating module 326 may display a slider element that is movable in a horizontal or vertical manner between a plurality of positions, where each position of the slider corresponds to one of the combined images or, in some implementations, the originally-captured image. The user may thereby sequentially view the originally-captured image, the first combined image, and any subsequent updated versions to track the changes to the presentation surface over time.

As illustrated, electronic whiteboard 350 includes a presentation surface 352, a storage location 356, and a transceiver module 360. It should be noted that, although described below as a whiteboard that integrates the components 352, 356, 360 into one device, these components may be divided between multiple devices in other embodiments. For example, presentation surface 352 may be a display screen that outputs electronic content or a projection screen that receives output from a projector. In such embodiments, storage location 356 and transceiver module 360 may be included in another device, such as a cloud-based server or any other device accessible by computing device 300 via a wired or wireless network.

In the illustrated embodiment, presentation surface 352 may be the front surface of whiteboard 350. Thus, a presenter or other person may make notations on surface 352 using a marker or electronic stylus. Note that in other embodiments, presentation surface 352 may be any area used for displaying electronic or handwritten content, such as a projection screen or an electronic display.

Regardless of the implementation, presentation surface 352 may include a fiducial marker 354, which may be any image that visually encodes data. For example, the fiducial marker may be a matrix barcode, such as a QR code. The fiducial marker may be placed in a predetermined position (e.g., a corner of surface 352) and may encode data, such as an identifier that uniquely identifies storage location 356 and/or digital version 358.

Storage location 356 may be any hardware storage device that is accessible to computing device 300 via a wired or wireless network. Storage location 356 may store one or more digital versions 358, each of which may be an image or other specification of the contents of electronic whiteboard 350 at a given time. For example, electronic whiteboard 350 may periodically save the contents of whiteboard 350 as a digital version 358 within storage location 356. As another example, electronic whiteboard 350 may delay generation of the digital version 358 until receiving a request 370 for the digital version from a computing device 300.

Finally, transceiver module 360 may be a set of electronic components for establishing a communication session with a computing device 300, such as a network interface card. In operation, transceiver module 360 may initially receive a request 370 from computing device 300 for a digital version 358 of presentation surface 352. In response, transceiver module 360 may retrieve the digital version 358 from storage location 356 and return the retrieved file to computing device 300 as digital version 372.

Figure 4:
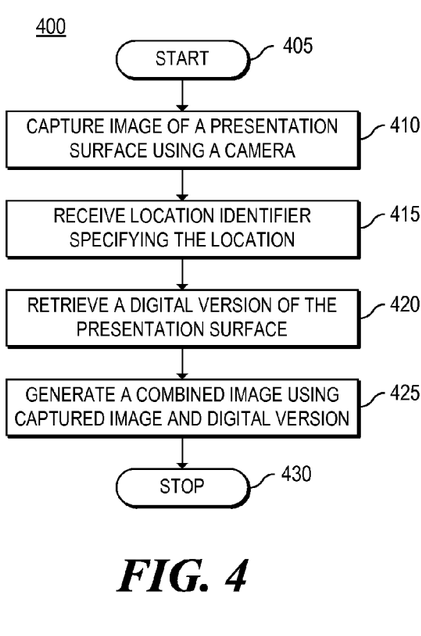
FIG. 4 is a flowchart of an example method for generating a combined image using a captured image and a retrieved digital version of a presentation surface.

FIG. 4 is a flowchart of an example method 400 for generating a combined image using a captured image and a retrieved digital version of a presentation surface. Although execution of method 400 is described below with reference to computing device 200 of FIG. 2, other suitable devices for execution of method 400 will be apparent to those of skill in the art (e.g., computing device 300). Method 400 may be implemented in the form of executable instructions stored on a machine-readable storage medium, such as storage medium 220, and/or in the form of electronic circuitry.

Method 400 may start in block 405 and continue to block 410, where computing device 200 may initially capture an image using a camera, such that a portion of the image includes a presentation surface. For example, a user may point the camera at the presentation surface and the surrounding environment, trigger the camera's capture function, and thereby obtain an image including both the presentation surface and the surrounding environment.

Next, in block 415, computing device 200 may receive a location identifier specifying a location of a digital version of the content currently displayed on the presentation surface. For example, the user may enter the location identifier directly into computing device 200. As an alternative, computing device 200 may analyze the image captured in block 410 to identify a fiducial marker, and may then decode the fiducial marker to extract the location identifier.

In block 420, computing device 200 may then retrieve the digital version of the content displayed on the presentation surface from the location specified by the location identifier. For example, computing device 200 may connect to the device at the determined location and send a request for a digital version of the current contents of the presentation surface. Computing device 200 may then receive the digital version of the contents of the presentation surface from the other device.

Finally, in block 425, computing device 200 may generate a combined image using the captured image and the retrieved digital version. Computing device 200 may initially identify the portion of the captured image that corresponds to the presentation surface. Computing device 200 may then generate a new image in which the digital version of the presentation surface is inserted into the image to replace the identified portion of the captured image. As an alternative to generating a new image, computing device 200 may simply replace the portion of the captured image that includes the presentation surface with the retrieved digital version. Method 400 may then proceed to block 430, where method 400 may stop.

Figure 5:
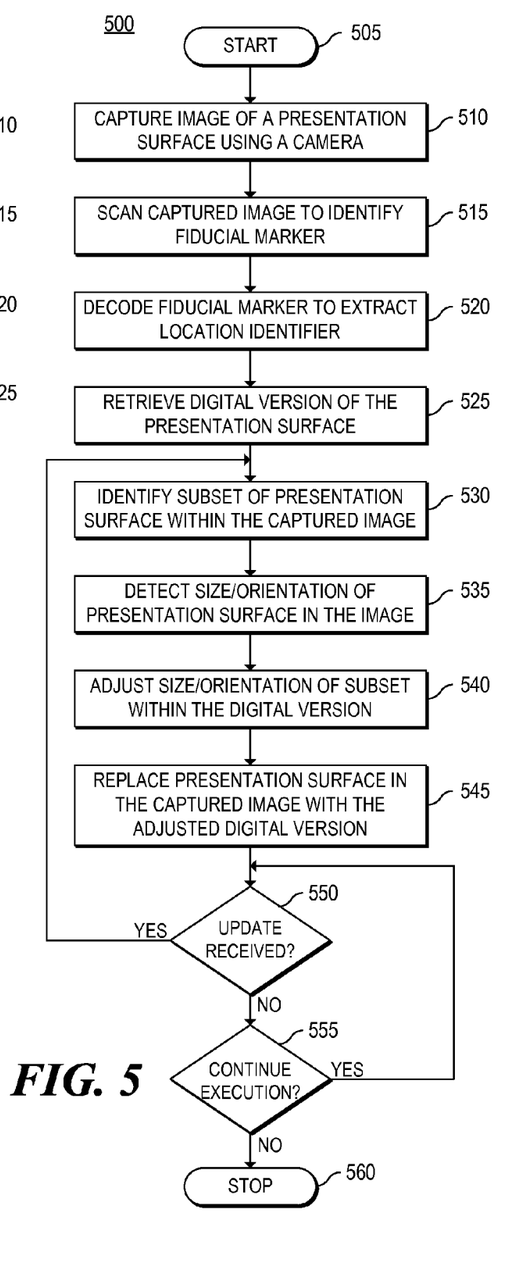
FIG. 5 is a flowchart of an example method for generating a combined image using a captured image and a retrieved digital version of a presentation surface, the digital version obtained by decoding a location identifier from a fiducial marker.

FIG. 5 is a flowchart of an example method 500 for generating a combined image using a captured image and a retrieved digital version of a presentation surface, the digital version obtained by decoding a location identifier from a fiducial marker. Although execution of method 500 is described below with reference to computing device 300 of FIG. 3, other suitable devices for execution of method 500 will be apparent to those of skill in the art. Method 500 may be implemented in the form of executable instructions stored on a machine-readable storage medium and/or in the form of electronic circuitry.

Method 500 may start in block 505 and continue to block 510, where computing device 300 may capture an image of a presentation surface using camera module 301. For example, a user may direct camera module 301 at the presentation surface and trigger the device's capture function, thereby obtaining an image including the presentation surface and the surrounding area.

Next, in block 515, computing device 300 may scan the captured image to identify a fiducial marker. For example, computing device 300 may scan the captured image for predetermined marker(s) that identify the fiducial marker. After identifying the fiducial marker, computing device 300 may then decode the fiducial marker in block 520. For example, computing device 300 may perform image analysis on the identified marker to extract a location identifier that specifies a location from which a digital version of the contents of the presentation surface may be retrieved. In block 525, computing device 300 may then connect to a remote device at the location extracted from the fiducial marker, request a copy of the digital version of the contents of the presentation surface, and receive the digital version from the remote device.

Next in block 530, computing device 300 may identify the subset of the presentation surface that is included in the captured image. For example, computing device 300 may perform image analysis to determine whether the entire presentation surface is included in the captured image and, if not, to identify which portion of the presentation surface is in the image.

In block 535, computing device 300 may then detect the size and orientation of the presentation surface within the captured image. For example, computing device 300 may initially determine the length and width of the presentation surface within the captured image in terms of the number of pixels. Computing device 300 may then determine the angle of rotation and any perspective effect of the presentation surface in the captured image. In block 540, computing device 300 may then adjust the size and orientation of the retrieved digital version to match the size and orientation determined in block 535. Then, in block 545, computing device 300 may insert the adjusted digital version into the captured image, such that the adjusted digital version replaces the presentation surface within the captured image.

In block 550, computing device 300 may then determine whether an updated digital version has been received from the device that maintains the digital version of the presentation surface. If so, method 500 may return to block 530, where computing device 300 may begin processing the newly-received digital version to generate a new combined image, as detailed above. Otherwise, if no update has been received, method 500 may continue to block 555.

Note that, when computing device 300 receives one or more updates and therefore generates multiple combined images, computing device 300 may output a user interface element for enabling the user to switch a currently-displayed image between the combined images. For example, computing device 300 may output a slider element that is movable in a horizontal or vertical manner, such that the user may thereby cycle through the combined images.

In block 555, computing device 300 may determine whether to proceed with execution of the method. For example, provided that computing device 300 remains powered on and the user indicates a desire to continue receiving digital version updates, method 500 may return to block 550, where computing device 300 may continue monitoring for updates. Alternatively, method 500 may proceed to block 560, where method 500 may stop.

The foregoing disclosure describes a number of example embodiments in which a user may capture an image of a presentation surface using a camera of a computing device and, in response, the device may generate a combined image that includes not only the presentation surface, but also the surrounding environment. In this manner, a user may easily obtain a high quality image of a presentation surface, while also capturing other targets of interest, such as a person speaking, an audience, and the room or environment. Additional embodiments and advantages of such embodiments will be apparent to those of skill in the art upon reading and understanding the foregoing description.

We claim:

1. A computing device for obtaining images of a presentation surface, the computing device comprising:
 a camera;
 a communication module configured to enable the computing device to engage in wired or wireless communication;
 a display; and
 a processor communicatively coupled with the camera, the communication module, and the display, the processor configured to:
   capture an image using the camera, a portion of the captured image including the presentation surface;
   obtain, from the image, a location identifier specifying a location, on a device separate from the computing device, at which a digital version of content displayed on the presentation surface is stored;
   retrieve, via the communication module, the digital version of the content displayed on the presentation surface from the location specified by the location identifier;
   generate a combined image by:
     identifying a target position within the captured image, and
     inserting, at the target position, at least a portion of the retrieved digital version of the content displayed on the presentation surface; and cause the display to show the combined image.

2. The computing device of claim 1, wherein the presentation surface is an electronic whiteboard, a projection screen, or an electronic display.

3. The computing device of claim 1, wherein, to obtain the location identifier, the processor is additionally configured to:
 scan the captured image to identify a fiducial marker included on the presentation surface; and
 extract the location identifier by decoding the fiducial marker.

4. The computing device of claim 3, wherein the processor is configured to cause the computing device to determine a length and width of the presentation surface based on information encoded in the fiducial marker.

5. The computing device of claim 1, wherein the processor is further configured to:
 receive an updated digital version of the content displayed on the presentation surface when the content on the presentation surface is modified; and
 generate a new combined image using the captured image and the updated digital version of the content displayed on the presentation surface.

6. The computing device of claim 5, wherein the processor is further configured to:
 cause the display to show a user interface element that enables a user to switch a currently-displayed image between the combined image, the new combined image, and any subsequently-created combined images.

7. The computing device of claim 1, wherein the processor is configured to insert the at least a portion of the retrieved digital version of the content displayed on the presentation surface by replacing the portion of the captured image that includes the presentation surface with the retrieved digital version.

8. The computing device of claim 7, wherein, to generate the combined image, the processor is additionally configured to:
 detect a size and orientation of the presentation surface within the captured image; and
 adjust a size and orientation of the retrieved digital version to match the size and orientation of the presentation surface prior to replacing the portion of the captured image that includes the presentation surface.

9. The computing device of claim 7, wherein, to generate the combined image, the processor is additionally configured to:
 identify a subset of the presentation surface that is included within the captured image; and
 replace the subset of the presentation surface in the captured image with a corresponding subset of the retrieved digital version.

10. The computing device of claim 1, wherein the processor is configured to determine whether the entire presentation surface is included in the image or whether only a portion of the presentation surface is in the image.

11. The computing device of claim 10, wherein the processor is configured to, when determining only a portion of the presentation surface is in the image, further determine which portion of the presentation surface is in the image.

12. The computing device of claim 1, wherein the processor is configured to insert the at least a portion of the retrieved digital version of the content displayed on the presentation surface by further truncating the retrieved digital version of the content displayed on the presentation surface.

13. A non-transitory machine-readable storage medium encoded with instructions executable by a processor of a computing device for obtaining images of a presentation surface, the machine-readable storage medium comprising:
  instructions for capturing an image using a camera of the computing device; wherein a portion of the captured image includes the presentation surface;
  instructions for obtaining, from the image, a location identifier specifying a location, on a device separate from the computing device, at which a digital version of content displayed on the presentation surface is stored;
  instructions for retrieving, via a communication module, the digital version of the content displayed on the presentation surface from the location specified by the location identifier;
  instructions for generating a combined image by:
    identifying a target position within the captured image, and
    inserting, at the target position, at least a portion of the retrieved digital version of the content displayed on the presentation surface; and
  instructions for causing a display of the computing device to show the combined image.

14. The machine-readable storage medium of claim 13, wherein the instructions for obtaining the location identifier comprise:
  instructions for analyzing the captured image to identify a fiducial marker included on the presentation surface; and
  instructions for extracting the location identifier by decoding the fiducial marker.

15. A method for obtaining images of a presentation surface using a computing device, the method comprising:
  capturing an image using a camera of the computing device, a portion of the captured image including the presentation surface;
  obtaining, from the image, a location identifier specifying a location, on a device separate from the computing device, at which a digital version of content displayed on the presentation surface is stored;
  retrieving, via a communication module of the computing device, the digital version of the content displayed on the presentation surface from the location specified by the location identifier; and
  generating, with a processing unit of the computing device, a combined image by:
    identifying a target position within the captured image, and
    inserting, at the target position, at least a portion of the retrieved digital version of the content displayed on the presentation surface; and
  causing a display of the computing device to show the combined image.

16. The method of claim 15, wherein inserting the at least a portion of the retrieved digital version of the content displayed on the presentation surface comprises:
  replacing the portion of the captured image that includes the presentation surface with the retrieved digital version.

17. The method of claim 16, wherein generating the combined image further comprises:
  detecting a size and orientation of the presentation surface within the captured image; and
  adjusting a size and orientation of the retrieved digital version to match the size and orientation of the presentation surface prior to replacing the portion of the captured image that includes the presentation surface.

18. An apparatus comprising:
  means for capturing an image, wherein a portion of the captured image includes a presentation surface;
  means for obtaining, from the image, a location identifier specifying a location, on a device separate from the apparatus, at which a digital version of content displayed on the presentation surface is stored;
  means for retrieving the digital version of the content displayed on the presentation surface from the location specified by the location identifier;
  means for generating a combined image by: combining the captured image and the retrieved digital version of the content displayed on the presentation surface
    identifying a target position within the captured image, and
    inserting, at the target position, at least a portion of the retrieved digital version of the content displayed on the presentation surface; and
  means for displaying the combined image.

19. The apparatus of claim 18, wherein the means for generating the combined image comprise means for replacing the portion of the captured image that includes the presentation surface with the retrieved digital version.

20. The apparatus of claim 19, wherein the means for generating the combined image further comprise:
  means for detecting a size and orientation of the presentation surface within the captured image; and
  means for adjusting a size and orientation of the retrieved digital version to match the size and orientation of the presentation surface prior to replacing the portion of the captured image that includes the presentation surface.

* * * * *